March 26, 1946. L. T. SACHTLEBEN 2,397,207
LENS COATING APPARATUS
Filed Oct. 29, 1943   2 Sheets-Sheet 2
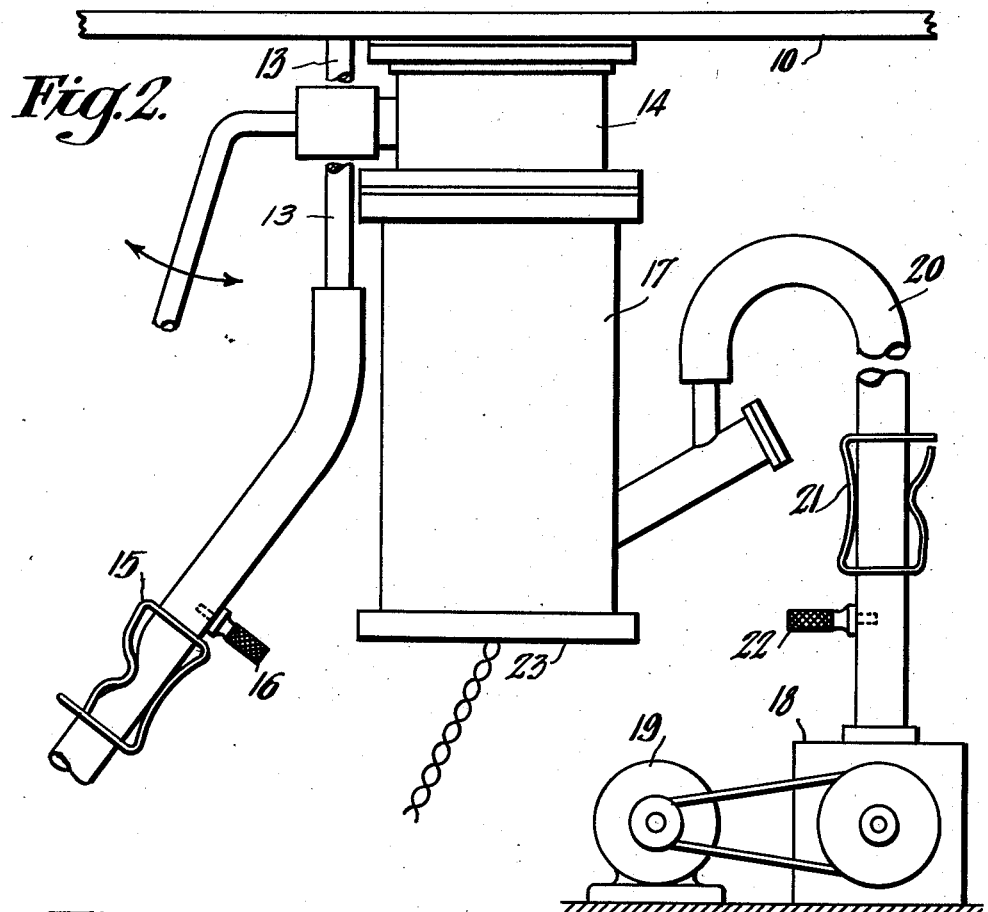
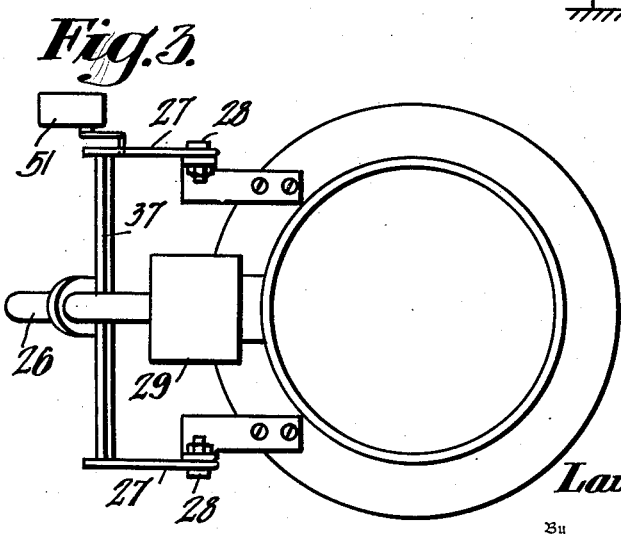
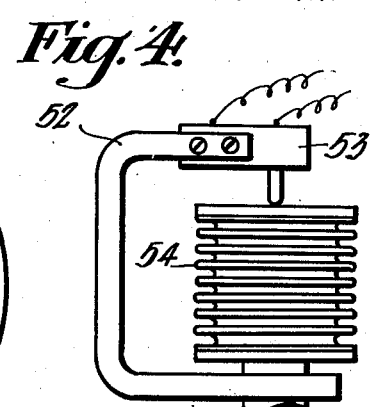
Inventor
Lawrence T. Sachtleben
By C. D. Tuska
Attorney Patented Mar. 26, 1946

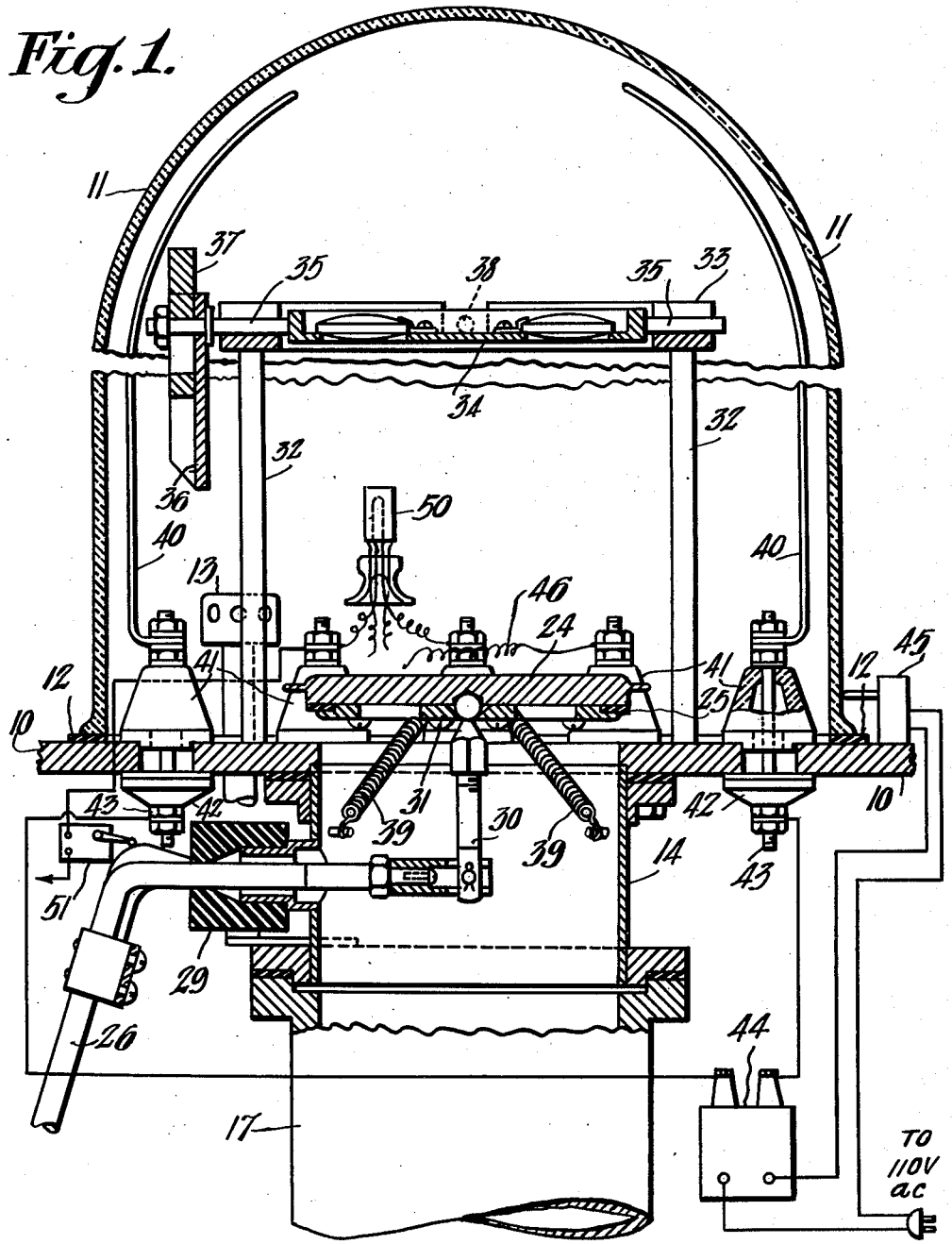

2,397,207

UNITED STATES PATENT OFFICE 2,397,207

LENS COATING APPARATUS

Lawrence Theron Sachtleben, Indianapolis, Ind., assignor to Radio Corporation of America, a corporation of Delaware Application October 29, 1943, Serial No. 508,267

4 Claims. (Cl. 91—12.2)

This invention relates to apparatus for coating lenses or other optical parts with an evaporated layer of magnesium fluoride or other transparent substance to either decrease the surface reflection thereof, to increase the surface reflection thereof, or to make the surface selectively reflective.

The apparatus involves a vacuum chamber, appropriate electrical connections to the vacuum chamber, appropriate pumps for the vacuum chamber, and suitable control elements for the accurate quantity production of treated optical parts. The apparatus includes: Means for reversing the lenses to coat opposite sides thereof, means for connecting the vacuum chamber to the rough vacuum pump, means for directly and efficiently connecting the vacuum chamber to the high vacuum oil diffusion pump, means for preventing the electrical connections within the vacuum chamber being activated while the chamber is open, means for preventing the operation of the thermionic vacuum gauge until the high vacuum pump is connected to the chamber, and other incidental means for the quantity production of optical surfaces such as described above.

One object of the invention is to provide an improved apparatus for evaporating materials in a vacuum.

Another object of the invention is to provide an improved apparatus for evaporating transparent materials on optical surfaces.

Another object of the invention is to provide means for coating both sides of optical elements in a vacuum without relieving the vacuum.

Another object of the invention is to provide means for turning articles over in a vacuum device to permit two or more sides to be treated.

Another object of the invention is to provide means for connecting a vacuum chamber to a rough vacuum pump independently of the connection to the high vacuum pump.

Another object of the invention is to provide means for directly and efficiently connecting a vacuum chamber to a high vacuum pump independently of the connection to the rough vacuum pump.

Another object of the invention is to provide an improved valve for connecting a vacuum chamber to the high vacuum pump.

Another object of the invention is to provide means for subjecting objects to be treated in a vacuum chamber to the effects of ionized gases.

Another object of the invention is to provide means for preventing the ionization potential from being applied to the ionizing electrodes in the vacuum chamber except when the chamber is in place and partly exhausted.

Another object of the invention is to provide means for preventing the actuation of the ionization gauge in the vacuum chamber until the vacuum has reached a sufficiently high degree.

Another object of the invention is to provide adequate means for carrying current to the electrical devices within a vacuum chamber.

Other incidental objects of the invention will be apparent from a reading of the following specification and an inspection of the accompanying drawings in which:

Figure 1 is a vertical sectional view of the apparatus;

Figure 2 is an elevation of the connections of the vacuum apparatus beneath the portion of the apparatus shown in Fig. 1;

Figure 3 is a detail of the valve actuating arm shown in Figs. 1 and 2; and

Figure 4 is a safety switch.

Referring first to Fig. 1, the larger portion of the apparatus is constructed upon and around the base plate 10 which is of some appropriately rigid material. This base plate 10 may conveniently be constructed of steel as it is readily available in proper sizes, thicknesses, and qualities, although the base plate may be of brass, plate glass or other suitable material. This base plate is preferably mounted in a table or workbench, or it may comprise the top of an appropriate table. The vacuum chamber is formed by the base plate and an appropriate bell jar 11. This bell jar is most conveniently made of glass but it may be made of steel or other metal in which appropriate viewing ports have been provided. The bell jar is sealed to the base plate by an appropriate gasket 12, which may be of suitably elastic rubber or other packing material which will provide an air-tight seal. The preliminary evacuation of the bell jar is performed through the ports and pipe indicated at 13. The ports 13 lead to a rubber hose and the operation of the valve or pinchcock 15 connects the interior of the bell jar to the rough pump. This rough pump is of any appropriate kind adapted to accomplish a reasonable evacuation of the bell jar very rapidly. With an appropriate rough pump a vacuum of 20 microns can be secured in approximately 2 minutes.

After the appropriate degree of vacuum is secured with the rough pump, the pinch-cock 15 is closed and the valve 24 is opened. The high vacuum pump, which is preferably an oil diffusion pump 17, is operated continuously by the electric heater 23. This pump 17 is connected through an appropriate rubber tubing 20 to the fore pump 18 driven by the motor 19. The fore pump 18 can be disconnected from the pump 17 by the pinch-cock 21. The pump 18 is preferably a mechanical oil pump adapted to secure a vacuum into which the diffusion pump 17 can operate.

The gasket 12 is preferably of a material of such flexibility that the rough pump pulls the bell jar 11 down against the gasket with sufficient force to secure an air-tight seal. If necessary, appropriate plastic or viscous compounds can be used on either or both sides of the gasket 12.

One novel feature of this apparatus is the connection from the bell jar to the high vacuum pump. An appropriate short connecting pipe 14 is attached to the base plate 10 at approximately the middle of the space occupied by the bell jar, this plate having a diameter substantially equal to the diameter of the entrance to the diffusion pump 17. The pipe 14 is secured into flanges in an appropriate gas-tight manner and the flanges are secured to the base plate 10 and the top of the vacuum pump 17 with suitable gaskets. The valve 24 is movable vertically above the base plate 10. It will be understood that the base plate 10 is machined or ground on the upper surface so that the upper surface of the base plate forms a suitable seal for the valve 24. The valve is provided with an appropriate sealing gasket 25 adapted to fit against the base plate which is secured to the valve member by a member 31 which also connects the ball on the top of the link 30 to the valve 24. The link 30 is moved vertically by the handle 26 which is pivoted at 28 by two appropriate bolts and carried on the bolt 28 by connecting members 27. Tension springs 39 attached to the valve 24, 120° apart, connect the valve to pins secured in the base plate 10. These springs insure the central position of the valve 24 in relation to the aperture in the base plate 10 both when the valve is open and when it is being closed. The handle member 26 passes through a rubber packing member 29 which fits securely around the member 26 and also engages the nipple on the left side of the member 14 in an air-tight manner. When the handle 26 is pushed down it raises the valve 24, permitting the evacuation of the bell jar by the diffusion pump 17 as described above.

A valve of the type indicated at 24 in Fig. 1, and connected as there shown, has many advantages in high-vacuum work over screw valves hitherto used in this connection. Screw valves are slow in operation, they tend to leak at low pressures, and give rise to packing difficulties. Ordinarily, screw valves are of such construction as to introduce a tortuous path into the conduit system. This is especially undesirable in high-vacuum work, for it greatly retards diffusion of the low pressure gas and reduces pumping speed. Screw valves which are capable of connecting a high-vacuum pump (say, 4" or more in diameter) to a high-vacuum chamber without reducing the cross-sectional area of the conduit at any point between the pump and the vacuum chamber, are very large, very heavy and very expensive. On the other hand, a valve of the type indicated at 24 and connected as shown in Fig. 1 is the ideal type of seal between a large diameter, high-speed, high-vacuum pump of the oil diffusion type and the chamber which it is intended to evacuate, because it permits a substantially direct connection of full pump diameter between the pump and the wall of the chamber to be evacuated. Essentially, it constitutes a simple lid which is set down over the mouth of the conduit to close the connection, or is lifted away to permit pumping, with the introduction of a minimum obstruction to the diffusion of the low pressure gases into the pump.

In order to clean thoroughly the surfaces of the optical elements to be treated in this device, they are treated with ionized gas in the vacuum chamber. The optical elements are thoroughly cleaned by ordinary means before they are placed in the vacuum chamber but this cleaning is inadequate to secure the further adherence of the coating materials. Accordingly after the assembly is in place the lens surfaces are treated with ionized gas which completes the cleaning on the surfaces. The ionization is accomplished as follows: Ionizing electrodes 40, preferably of magnesium, are connected to the high voltage transformer 44 through appropriate terminals 43 properly insulated by bushings 41 and 42, the primary of the transformer 44 is connected to a switch 45 so that the primary circuit cannot be closed unless the bell jar 11 is in place. This feature prevents any danger of shocks to the workers with the apparatus. When the bell jar 11 is in place it closes the switch 45 so that the high voltage can be applied to the electrodes 40. If desired, this voltage may not be applied until the vacuum in the bell jar has reached an appropriate value but it may be applied as soon as the bell jar is in place and has closed the switch 45. After the vacuum has reached the value of the order of 9 to 6 millimeters of mercury the glow discharge will start and will continue until the vacuum has become so high as to prevent any discharge between these electrodes with the voltage applied by the transformer 44.

In order to measure the vacuum within the bell jar 11 an ionization gauge 50 is provided. This gauge may be constituted of the electrodes of a conventional vacuum tube with the envelope removed. If it is desired to protect the electrodes, the envelope may be merely perforated, but the gauge is not strictly accurate at high pumping speeds unless the envelope is removed so that the space between the electrodes has the same vacuum as the other space in the bell jar. An appropriate vacuum tube for this purpose is that known as the UY224, although any other tube capable of suitable calibration may be used. The ionization gauge is connected to appropriate meters exterior of the vacuum apparatus as is customary. The construction and operation of a gauge of this type are described in "Procedures in Experimental Physics," by John Strong, published by Prentice-Hall, Inc., of New York, at page 143. In order to prevent the actuation of the ionization gauge either when the bell jar is removed or when there is a poor vacuum which would cause damage to the electrodes, particularly the cathode, the cathode of the gauge 50 is connected in series with a switch 51 which is adapted to cooperate with the supports 27 of the handle 26. When the handle 26 is raised so that the valve 24 is closed, the cooperating member of the switch 51 is also moved so that the switch 51 is open and no current can pass through the cathode of the gauge 50. When the valve 24 is open and the bell jar is connected to the diffusion pump 17, the switch 51 is closed and the gauge 50 can then be operated.

Since in normal operation the high-vacuum pump is working continuously, closure of the valve 24 and introduction of air above it effectively seals the valve due to the pressure difference on its two surfaces. The valve cannot then be lifted again until the vacuum is restored above it; and since the cathode circuit of the ionization gauge cannot be closed except when the valve is open, the possibility of damage to the electrodes of the gauge, resulting from a poor vacuum in the chamber 11, is eliminated.

After an appropriate degree of vacuum is reached, the optical elements held in the lens carrier 34 are treated by evaporating an appropriate coating thereon. This coating may be, for example, magnesium fluoride or an analogous substance to reduce the reflection at the surface of the glass. This is accomplished by evaporating the coating material by means of the electrically heated filament 46. The lens carrier 34 is carried by shafts 35 in the tripod ring 33 and is preferably maintained in a horizontal position by a stop 38 which also rests against the tripod ring 33, the whole being carried upon legs 32. After the proper quantity of material is evaporated from the filament 46 on the lower surface of the optical elements, the carrier 34 is reversed, i. e., it is turned 180° on the shafts 35. In order to accomplish this an iron armature 36 is secured to one of the shafts 35 and is counterbalanced by a non-magnetic material—for example, lead, as indicated at 37. In order to reverse the carrier 34, a magnet is brought to the exterior of the bell jar 11, and by moving it in an appropriate manner the iron member 36 is moved around the axis of the shafts 35, thereby rotating the carrier 34 whereupon the opposite side of the optical elements may be treated.

Figure 4 shows a type of vacuum switch which may be used in place of the switches 45 or 51, or both. This switch embodies a metallic bellows 54, a frame 52, and a switch member 53. When the metallic bellows 54 is extended, a switch member 53 may be open and when the metallic bellows 54 is contracted, as for example by the application of vacuum to its interior while the exterior is subjected to atmospheric air pressure, the switch 53 can be closed. Conversely, if the device of Fig. 4 is to be used within the vacuum chamber, the metallic bellows 54 may be sealed with air or other gas at an appropriate pressure and the switch 53 may close the circuit when the metallic bellows is expanded. For example, the switch of Fig. 4 may be substituted by the switch of 45 by so connecting it to the interior of the bell jar 11 that it will close the circuit to the primary of the transformer 44 when the vacuum within the bell jar 11 has reached an appropriate degree. As indicated above, this may be accomplished either by locating the switch within the bell jar with connections to the exterior or by locating the switch outside of the bell jar with a connection on the interior of the metallic bellows to the interior of the bell jar. Likewise, this switch can be substituted for the switch 51 but in this case either the tension of the metallic bellows 54 or the gas content thereof should be adjusted so that the switch will not be closed until an appropriate degree of vacuum is reached, so that the ionization gauge 50 can be satisfactorily operated.

After the optical elements of the device have been treated, the current is shut off from the filament 46, the valve 24 is closed, and the plug valve 16 is opened so as to admit air to the interior of the bell jar, when the bell jar may be removed and the lens carrier replaced by a freshly loaded lens carrier and the operation repeated.

Although rubber tubes and pinch-cocks have been above described for the transmission of air from the vacuum chamber, it will be apparent that pipes or tubes of other materials may be substituted and that valves of appropriate type may be used instead of pinch-cocks.

I claim as my invention:

1. Vacuum treating apparatus including a vacuum chamber, means for evacuating said vacuum chamber, ionizing electrodes within said vacuum chamber, means including an electrical circuit for supplying voltage and current to said ionizing electrodes and means for maintaining said circuit in open position unless the vacuum chamber is in operating position.

2. Vacuum treating apparatus including a vacuum chamber, a high vacuum pump connected to said chamber by a poppet valve, an ionization gauge in said vacuum chamber, an electrical circuit for energization of said gauge and means for maintaining said circuit in open position unless said poppet valve is open.

3. Vacuum treating apparatus including a vacuum chamber, means for evacuating said vacuum chamber, a work support supported on shafts in said vacuum chamber and connected to one of said shafts, magnetic means operable from the exterior of the vacuum chamber for moving the work support about a horizontal axis a non-magnetic counterweight for said magnetic means and a stop for said work support in its operating position.

4. The combination of means defining an evacuable chamber, means for creating a high vacuum, a walled conduit connecting the chamber to said evacuating means and having an aperture in a wall thereof, a poppet valve for controlling the passage of fluid through the conduit, means operable from the exterior of the conduit and extending through the aperture for controlling the position of the valve, and a resilient packing member surrounding said valve-controlling means at said aperture to form an air-tight seal thereat.

LAWRENCE THERON SACHTLEBEN.